US008791966B2

(12) United States Patent
Hayashi

(10) Patent No.: US 8,791,966 B2
(45) Date of Patent: Jul. 29, 2014

(54) DISPLAY DEVICE AND ELECTRIC APPARATUS

(75) Inventor: Keiji Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 966 days.

(21) Appl. No.: 12/936,561

(22) PCT Filed: Nov. 26, 2008

(86) PCT No.: PCT/JP2008/071436
§ 371 (c)(1),
(2), (4) Date: Oct. 6, 2010

(87) PCT Pub. No.: WO2009/130816
PCT Pub. Date: Oct. 29, 2009

(65) Prior Publication Data
US 2011/0025731 A1 Feb. 3, 2011

(30) Foreign Application Priority Data
Apr. 25, 2008 (JP) ................................. 2008-115399

(51) Int. Cl.
*G09G 5/10* (2006.01)
(52) U.S. Cl.
USPC .......................................................... 345/690
(58) Field of Classification Search
USPC .................................................. 345/690, 87
See application file for complete search history.

(56) References Cited

U.S. PATENT DOCUMENTS

| 2005/0073495 A1* | 4/2005 | Harbers et al. ................. 345/102 |
| 2006/0232545 A1* | 10/2006 | Sekiguchi ...................... 345/102 |
| 2010/0134524 A1 | 6/2010 | Hayashi et al. |

FOREIGN PATENT DOCUMENTS

| JP | 2000275636 | * | 6/2000 | ............ G02F 1/1335 |
| JP | 2000-275636 A | | 10/2000 | |
| JP | 2007-322988 A | | 12/2007 | |
| WO | 2008/146692 A1 | | 12/2008 | |

OTHER PUBLICATIONS

Official Communication issued in International Patent Application No. PCT/JP2008/071436, mailed on Jan. 13, 2009.

* cited by examiner

*Primary Examiner* — Yong H Sim
(74) *Attorney, Agent, or Firm* — Keating & Bennett, LLP

(57) ABSTRACT

It is an object of the present invention to provide a display device in which the color purity of red display can be improved and also to provide an electric apparatus using the same. A controller (19) of the display device is provided with an illumination control part (22) that turns on a light-emitting diode (first light source) (9C) to emit a cyan light during the former half of one frame time period and turns on a light-emitting diode (second light source) (9M) to emit a magenta light during the latter half of the one frame time period. In addition, a video signal converting part (21*b*) is provided to a panel control part (display control part) 21. The video signal converting part 21*b* converts an inputted video signal to video signals for the former half and the latter half of the one frame time period, on the basis of the inputted video signal and the colors of the lights in the former half and the latter half of the one frame time period. The present invention is applicable to, for example, a television receiver having a transmission type liquid crystal display device.

7 Claims, 9 Drawing Sheets

DISPLAY DEVICE AND ELECTRIC APPARATUS

TECHNICAL FIELD

The present invention relates to a display device and an electric apparatus using the same.

BACKGROUND ART

Recently, in the field of television receiver for household use for example, a display device represented by a liquid crystal display device that includes a liquid crystal panel as a flat display part having numbers of features such as decreased thickness and decreased weight in comparison with a conventional cathode-ray tube, have been mainstream. Such a liquid crystal display device is provided with an illumination device (backlight) that emits light and a liquid crystal panel that displays a desired image by functioning as a shutter against light from a light source provided to the illumination device. And in the television receiver, information such as characters and images included in the video signals of the television broadcast are displayed on the screen of the liquid crystal panel.

Furthermore, as the aforementioned illumination device, an edge light type or a direct type backlight device is provided in which a linear light source constituted of a cold-cathode tube or a hot-cathode tube is placed on a side of or below the liquid crystal panel. However, the cold-cathode tube such as described above and the like contains mercury, resulting in difficulty in, for example, recycling the cold-cathode tube to be disposed of. In view of this, an illumination device whose light source is light-emitting diodes (LEDs) in which mercury is not used has been developed.

Further, as a conventional liquid crystal display device, a product using an illumination device including a plurality kinds of LEDs has been proposed as described in JP 2000-275636 A. In other words, in this conventional liquid crystal display device, first and second LEDs for emitting monochromatic lights of blue and red are provided, and a phosphor film is placed on the front face of the first LED so as to generate a green light from the blue light from the first LED. And this conventional liquid crystal display device obtains white light by additive mixture of color stimuli of blue light, green light and red light, and allows the white light to enter the liquid crystal panel.

DISCLOSURE OF INVENTION

Problem to be Solved by the Invention

However, the conventional liquid crystal display device has a problem, namely, in a case of red color display, an interaction with a color filter of red pixels provided on the liquid crystal panel hinders improvement of the color purity.

Hereinafter, the problem of color purity will be specified with reference to FIG. 10.

FIG. 10 is a diagram for explaining problems of a conventional liquid crystal display device.

As shown in FIG. 10A, in the conventional liquid crystal display device, the emission wavelength regions of red light, green light and blue light emitted from the illumination device are indicated as curves 50r, 50g and 50b in FIG. 10A, respectively. Whereas, in the conventional liquid crystal display device, the transmission wavelength region of the red color filter provided to the red pixels in the liquid crystal panel is as indicated with the curve 60r in FIG. 10B, which overlaps partially with the emission wavelength region of the green light as indicated with slashes in FIG. 10B. Namely, in the conventional liquid crystal display device, when the transmittance of the red pixels is set to a value other than zero, green light is transmitted through the red pixels. As a result, unnecessary yellow light is included in the light from the red pixels, which may hinder improvement of color purity of the red display.

Therefore, with the foregoing in mind, it is an object of the present invention to provide a display device that can improve color purity of red display and an electric apparatus using the display device.

Means for Solving Problem

For achieving the above-described object, a display device according to the present invention includes: a first light source having a blue illuminant that emits blue light and a green phosphor provided to cover the blue illuminant, a second light source that emits light in a complementary relationship with the light from the first light source, a display element comprising pixels of plural colors that display colors different from each other, configured to be capable of displaying white color with the pixels of plural colors, where lights from the first light source and the second light source enter, an illumination control part configured to be capable of controlling lighting of the first light source and the second light source independently from each other, and a display control part that conducts a drive control of the display element for each pixel with use of an inputted video signal. The display control part converts the inputted video signal to a video signal for the former half of one frame time period and a video signal for the latter half of the one frame time period, on the basis of the inputted video signal and the colors of lights from the first light source and the second light source in the former half and the latter half of the one frame time period, and outputs the video signals toward the display element.

In the display device configured as described above, a first light source that emits blue light and green light and also a second light source that emits light in a complementary relations with the lights from the first light source, namely, a red light, are provided. The first and second light sources are controlled in the lighting independently from each other by an illumination control part. To the display element, pixels of plural colors that can display white color are provided, so that the display control part conducts a drive control of the display element for each pixel by using an inputted video signal. Further, the display control part converts the inputted video signal to a video signal for the former half of the one frame time period and a video signal for the latter half of the one frame time period, on the basis of the inputted video signal and the colors of lights from the first and second light sources in the former half and the latter half of the one frame time period, and outputs toward the display element. Thereby, the display element can display information in the former half and the latter half of the one frame time period, due to suitable video signals according to respective lights from the corresponding first and second light sources. As a result, the color purity of the red display can be improved in the display device, unlike the above-described example of conventional technique.

It is preferable in the display device that when the display control part converts an inputted video signal to a video signal for the former half of the one frame time period and a video signal for the latter half of the one frame time period, the display control part uses transmittances of the respective pixels of the plural colors during the one frame time period, the transmittances being determined on the basis of the inputted video signal, so as to determine the respective transmittances of the corresponding pixels in the former half and the latter half of the one frame time period.

In this case, the display control part can determine more suitably the video signals for the former half and the latter half of one corresponding frame time period, in accordance with the respective lights from the first and second light sources, and thus can improve the color purity reliably even when displaying dynamic images with high quality.

In the display device, the display control part may use values other than zero as the values for respective transmittances in the former half and the latter half of the one frame time period, at the respective pixels of plural colors.

In this case, it is possible to prevent degradation of the efficiency for light utilization of the first and second light sources, and to prevent degradation in the brightness.

Here, when the value of the transmittance is zero, it indicates that the respective pixels of the plural colors are set to be a non-transmitting state.

It is further preferable in the display device that pixels of red, green and blue are used for the pixels of plural colors, the illumination control part turns on one of the first light source and the second light source and the other of the first light source and the second light source during one of the former half and the latter half of the one frame time period and during the other of the former half and the latter half of the one frame time period, respectively. The display control part sets the transmittances of the pixels of red, green and blue as y, g and b2 respectively during the first light source is turned on in either the former half or the latter half of the one frame time period, and sets the transmittances of the pixels of red, green and blue as r, m and b1 respectively during the second light source is turned on in the other of the former half and the latter half of the one frame time period, and when the transmittances of the pixels of red, green and blue in the one frame time period determined on the basis of the inputted video signal are set as TR, TG and TB respectively and when min(A, B) indicates that the lower value of the values A and B is selected, the transmittances y, g, b2, r, m, and b1 are determined to satisfy inequalities (1), (2) and (3) below:

$$b2 \leq \min(TB, TG) \tag{1}$$

$$m \leq \min(TR, TB) \tag{2}$$

$$y \leq \min(TG, TR) \tag{3}$$

and to satisfy equalities (1), (2) and (3) below including coefficients $\alpha$, $\beta$, $\gamma$ and $\delta$ that satisfy inequalities (4), (5), (6) and (7) below:

$$TR = r + \alpha y + \beta m \tag{1}$$

$$TG = (1+\delta)g + \alpha y + \beta m + \gamma b2 \tag{2}$$

$$TB = (b1+b2)/2 + \delta g + \gamma b2 \tag{3}$$

$$0 < \alpha \leq 0.5 \tag{4}$$

$$0 < \beta \leq 0.5 \tag{5}$$

$$0 < \gamma \leq 0.25 \tag{6}$$

$$0 < \delta \leq 0.25 \tag{7}$$

In this case, for satisfying the inequalities (1) to (3) and the equalities (1) to (3), the transmittances y, g, b2, r, m, and b1 of the respective pixels of red, green and blue during the first and second light sources are turned on in the former half and the latter half of the one frame time period are determined, thereby, it is possible to conduct easily a control of gradually increasing the amount of light to be transmitted, with the trend that the video signals change from a low gradation to a high gradation at each of the pixels, and thus, the relationship between the gradation signal and the brightness (gamma characteristics) at the liquid crystal display device can be adjusted easily to have a smoother form.

In the display device, the display control part may determine the transmittances y, g, b2, r, m, and b1 for satisfying equalities (4) and (5) below when the transmittances TR, TG and TB are equal to each other:

$$r = g = (b1+b2)/2 \tag{4}$$

$$b2 = y = m \tag{5}$$

In this case, even when conducting an achromatic color display where the respective values of the transmittances TR, TG and TB are equal to each other, it is possible to suitably determine the transmittances y, g, b2, r, m and b1 of the respective pixels of red, green and blue during the first and second light sources are turned on in the former half and the latter half of the one frame time period. As a result, a suitable achromatic color display can be conducted reliably in the former half and the latter half of the one frame time period.

In the display device, the first and second light sources may be provided to face the display element, and the first light source and the second light source may be placed within a predetermined distance from each other.

In this case, it is possible to prevent the first and second light sources from being visually-recognized independently.

It is preferable in the display device that a blue illuminant that emits blue light and a red phosphor provided to cover the blue illuminant are used for the second light source.

In this case, a common blue illuminant can be used for the first and second light sources, and unlike the case where a red illuminant is used for the second light source, the configuration and control of the lighting circuit for the first light source can be the same as those for the second light source.

It is preferable in the display device that a light-emitting diode that emits light having spectra mainly in wavelength regions of blue and green is used for the first light source, and a light-emitting diode that emits light having spectra mainly in wavelength regions of blue and red is used for the second light source.

In this case, the configurations of the first and second light sources can be made simple easily, and a compact display device can be configured easily.

An electric apparatus of the present invention is an electric apparatus including a display part for displaying information including characters and images, and characterized in that any of the above-described display devices is used for the display part.

In the electric apparatus configured as described above, since a display device that can improve the color purity of the red display is used for the display part, an electric apparatus including a display part having excellent display performance can be configured easily.

Effects of the Invention

According to the present invention, a display device that can improve the color purity of red display and an electric apparatus using the same can be provided.

DESCRIPTION OF THE INVENTION

Hereinafter, preferred embodiments of display devices of the present invention and electric apparatuses using the same will be specified with reference to the attached drawings. The description below refers to a case where the present invention is applied to a television receiver provided with a transmission type liquid crystal display device. It should be noted that the dimensions of the components in each of the drawings do not necessarily indicate the actual dimensions of the components and dimensional ratios among the respective components and the like.

First Embodiment

Figure 1:
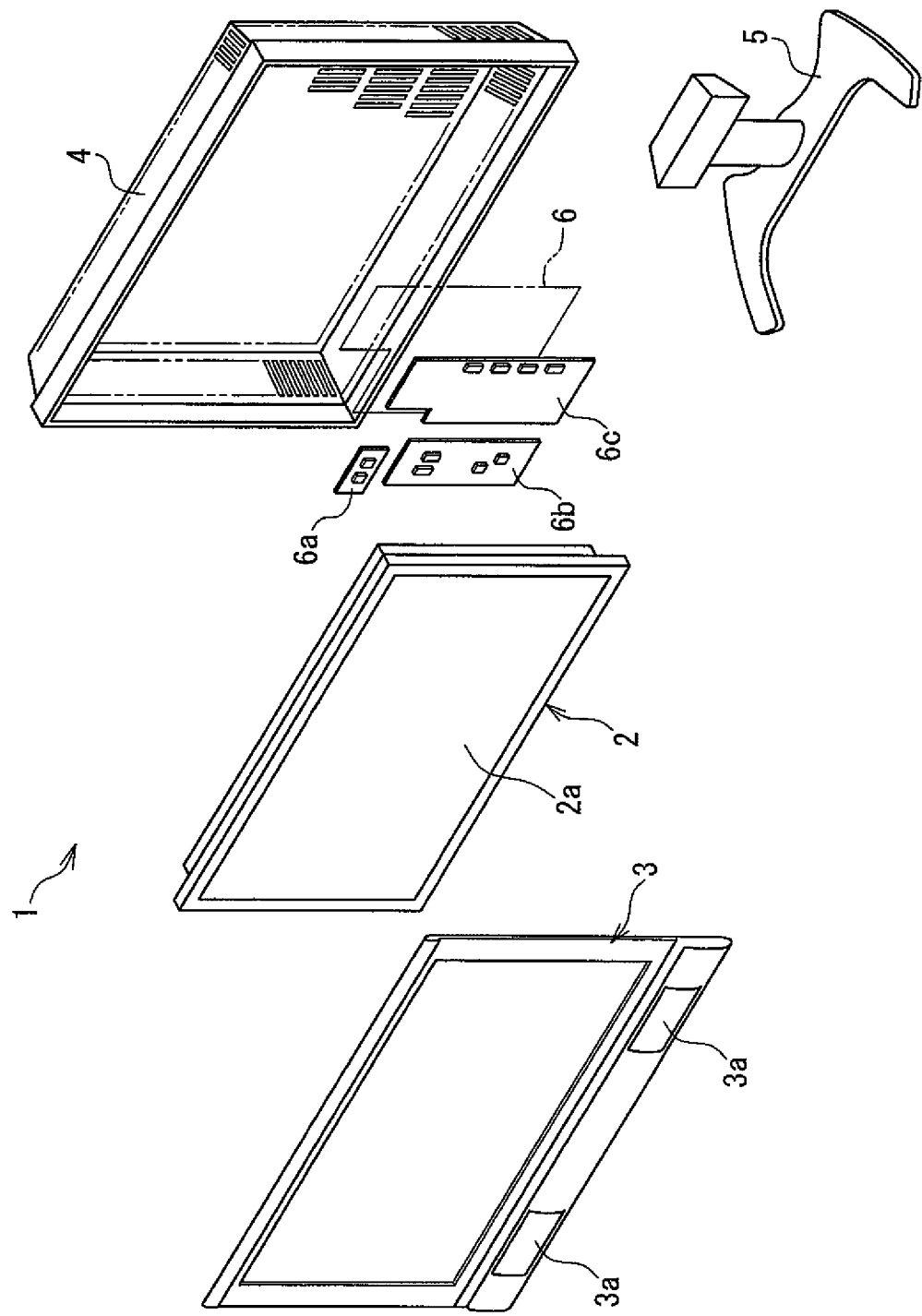
FIG. 1 is an exploded perspective view for explaining a television receiver and a liquid crystal display device according to First Embodiment of the present invention.

FIG. 1 is an exploded perspective view for explaining a television receiver and a liquid crystal display device according to First Embodiment of the present invention. In this drawing, a television receiver 1 of the present embodiment includes a liquid crystal display device 2 as a display device and is configured to be capable of receiving television broadcast through an antenna, a cable or the like (not shown). The liquid crystal display device 2 will be set by a stand 5 in a state housed in a front cabinet 3 and a back cabinet 4. Further, in the television receiver 1, a display surface 2a of the liquid crystal display device 2 is configured to be recognized visually via the front cabinet 3. This display surface 2a is set by the stand 5 so as to be parallel to the direction the gravity acts (vertical direction).

In the television receiver 1, between the liquid crystal display device 2 as a display part to display information including characters and images and the back cabinet 4, a TV tuner circuit board 6a to be attached to a support plate 6, a control circuit board 6b to control the respective parts such as a backlight device as mentioned below of the television receiver 1, and a power source circuit board 6c are placed. In the television receiver 1, images corresponding to the video signals of television broadcast received by the TV tuner on the TV tuner circuit board 6a are displayed on the display surface 2a, and audio is regenerated and outputted from loudspeakers 3a provided on the front cabinet 3. Numbers of vent holes are formed on the back cabinet 4 so as to suitably radiate heat generated at the illumination device, the power source and the like.

Hereinafter, the liquid crystal display device 2 will be specified below with reference to FIG. 2.

Figure 2:
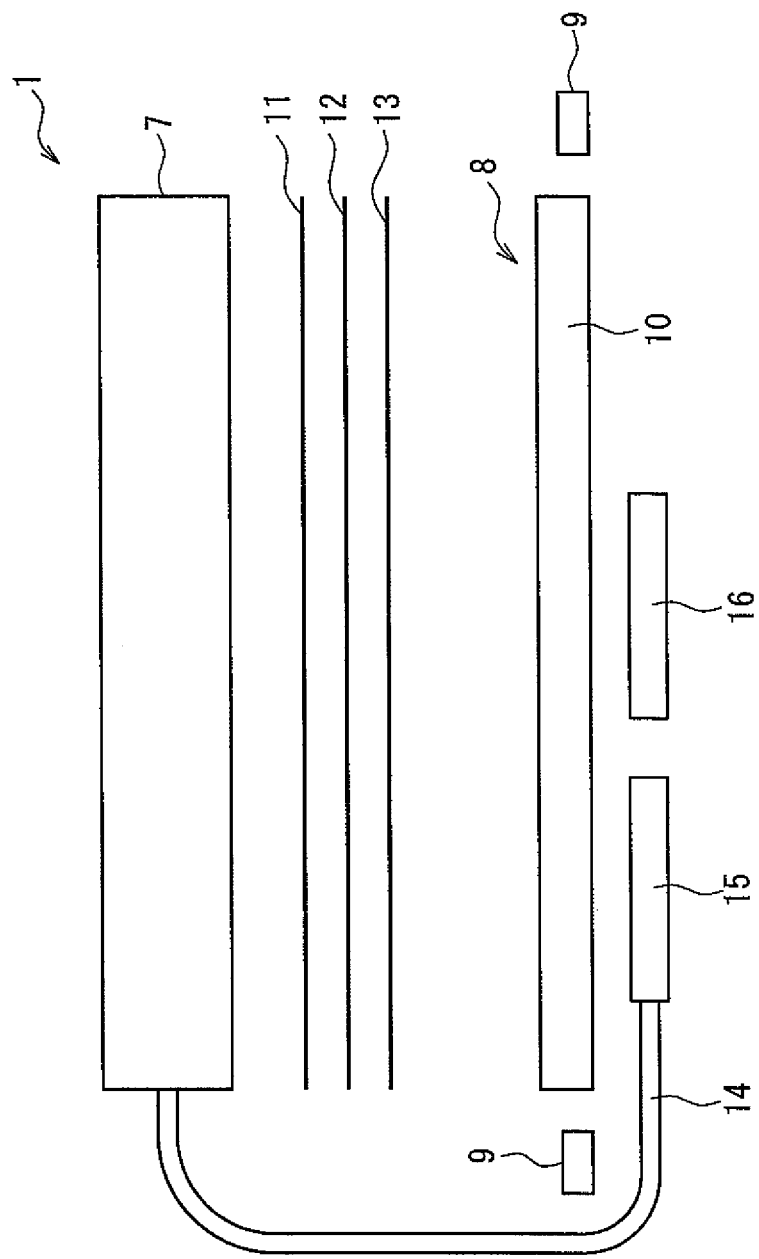
FIG. 2 is a diagram for explaining configurations of main parts of the liquid crystal display device.

FIG. 2 is a diagram for explaining the configurations of main parts of the liquid crystal display device. In the drawing, the liquid crystal display device 2 is provided with a liquid crystal panel 7 as a display element and an illumination device 8 that is placed on the non-display surface side of the liquid crystal panel 7 (the bottom in the drawing) and that generates light for illuminating the liquid crystal panel 7. The liquid crystal panel 7 and the illumination device 8 are integrated as the transmission type liquid crystal display device 2.

The illumination device 8 has a plurality of light-emitting diodes 9 and a light guide plate 10 into which light from each of the light-emitting diodes 9 is introduced. The illumination device 8 used here is an edge-light type that emits planar light from the light guide plate 10 toward the liquid crystal panel 7. The plural light-emitting diodes 9 include two kinds of light-emitting diodes 9C, 9M whose emission colors are different from each other as described below, and these light-emitting diodes 9C, 9M are arrayed alternately in a direction perpendicular to the paper of FIG. 2 and in a state facing the side face of the light guide plate 10.

In the liquid crystal display device 2, for example, a polarizing sheet 11, a prism (condensing) sheet 12 and a diffusion sheet 13 are provided between the liquid crystal panel 7 and the light guide plate 10. These optical sheets serve to suitably raise the brightness of the illuminated light from the illumination device 8 for example, thereby improving the display performance of the liquid crystal panel 7.

In the liquid crystal display device 2, a liquid crystal layer (not shown) included in the liquid crystal panel 7 is connected to a driving circuit 15 via an FPC (Flexible Printed Circuit) 14, and the driving circuit 15 is configured to be able to drive the liquid crystal layer for each pixel. Further, in the vicinity of the driving circuit 15, an inverter circuit 16 is placed. This inverter circuit 16 is configured to turn on and drive the plural light-emitting diodes 9. Both the driving circuit 15 and the inverter circuit 16 are provided on the control circuit board 6b (FIG. 1).

Hereinafter, the configurations of the liquid crystal panel 7 and the illumination device 8 in the liquid crystal display device 2 and a method of driving the same will be described more in detail with reference to FIGS. 3-6. It should be noted that FIG. 3 is a diagram showing schematically the functional relationship between the liquid crystal panel 7 and the illumination device 8, but not expressing precisely the physical dimensions of the liquid crystal panel 7 and the illumination device 8.

Figure 3:
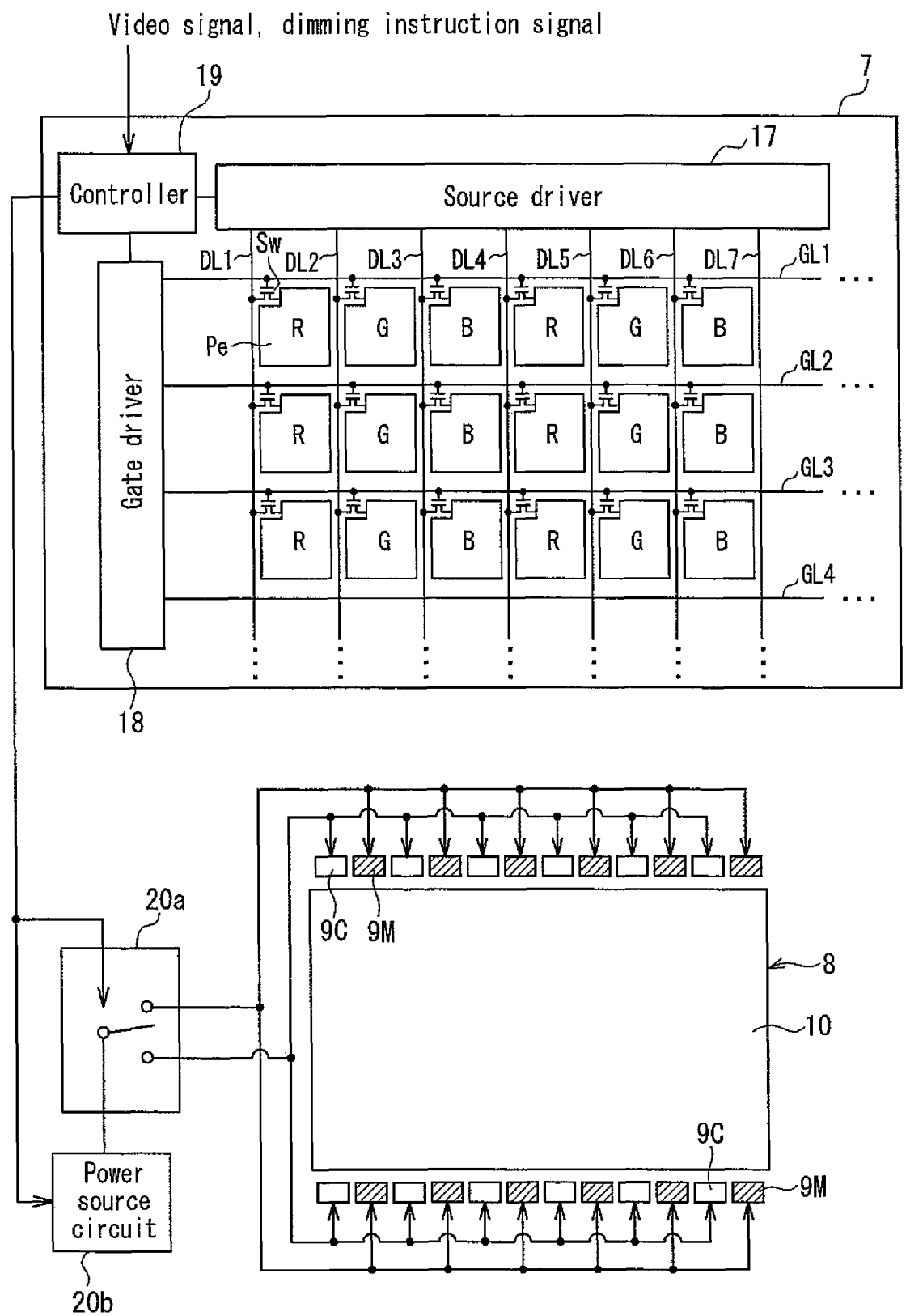
FIG. 3 is a block diagram showing functional configurations of the liquid crystal display device.

The liquid crystal panel 7 is an active matrix type liquid crystal display element and, as shown in FIG. 3, it has a plurality of scanning lines GL1, GL2, GL3, . . . (hereinafter collectively called "GL") and a plurality of data lines DL1, DL2, DL3, . . . (hereinafter collectively called "DL") arranged in matrix, thin film transistors (hereinafter abbreviated as "TFT") Sw as switching elements placed at the intersections between the scanning lines GL and the data lines DL, and pixel electrodes Pe connected to drain electrodes of the TFT Sw.

The liquid crystal panel 7 is further provided with: a gate driver 18 that supplies sequentially a selection signal to the scanning lines GL; a source driver 17 that supplies a data signal to the data lines DL; and a controller 19 that supplies a clock signal, a timing signal and the like to the source driver 17, the gate driver 18 and the like. The source driver 17, the gate driver 18 and the controller 19 are included in the driving circuit 15 (FIG. 2).

The liquid crystal display device 2 includes further a switching circuit 20a that controls on/off of the light-emitting diodes 9C, 9M of the illumination device 8 in accordance with the timing signal and the like supplied by the controller 19. The switching circuit 20a turns ON/OFF the supply of voltage from a power source circuit 20b or the like to the light-emitting diodes 9C, 9M so as to control on/off of the light-emitting diodes 9C, 9M. The switching circuit 20a is included in the inverter circuit 16 (FIG. 2). The switching circuit 20a is configured to control ON/OFF of all of the plural light-emitting diodes 9C simultaneously and also control ON/OFF of all of the plural light-emitting diodes 9M simultaneously.

It should be noted that the configurations of the driver and the controller shown in FIG. 3 are just an example, and the embodiment for mounting these driving circuits are arbitrary. For example, these driving circuits may be formed at least partially on an active matrix substrate monolithically. Alternatively, they may be mounted as semiconductor chips on a substrate, or may be connected as external circuits of the active matrix substrate. The switching circuit 20a may be provided to any of the liquid crystal panel 7 or the illumination device 8.

On a counter substrate (not shown) that faces the active matrix substrate, color filters of RGB tricolor are formed in stripes. In FIG. 3, the colors of the color filters corresponding to the respective pixels are indicated with signs of R, G and B. Thereby, as shown in FIG. 3, all of the pixels in a column connected to a common data line DL become pixels to display any of the colors RGB. For example, in FIG. 3, all of the pixels connected to the data line DL1 become pixels to display red. Though this paragraph refers to an example where the color filters are of a stripe array, other arrays such as a delta array may be applied. In the liquid crystal panel 7, white display can be conducted with pixels composed of a group of RGB.

In the thus configured liquid crystal panel 7, when a gate pulse (selection signals) of a predetermined voltage is applied sequentially to the scanning lines GL1, GL2, GL3, GL4 . . . , the TFT Sw connected to the scanning line GL applied with the gate pulse enters an ON state, and the gradation voltage being applied to the data line DL at that moment is written on the TFT Sw. Thereby, the potential of the pixel electrode Pe connected to the drain electrode of this TFT Sw becomes equal to the gradation voltage of the data line DL. As a result, the array of liquid crystals lying between the pixel electrode Pe and the counter electrode mentioned above varies in accordance with the gradation voltage so as to provide a gradation display of the pixels. During a non-selection voltage is applied to the scanning lines GL, since the TFT Sw enters an OFF state, the potential of the pixel electrode Pe is retained at the potential applied at the time of writing.

At the illumination device 8, as shown in FIG. 3, respectively six light-emitting diodes 9C, 9M are arrayed to align alternately with respect to the respective two side faces opposing each other of the light guide plate 10. For the light-emitting diode 9C, a light-emitting diode that emits light having mainly spectra of wavelength regions of blue and green (hereinafter, this may be referred to "cyan light") is used, and the light-emitting diode 9C composes a first light source. For the light-emitting diode 9M, a light-emitting diode that emits light having mainly spectra of wavelength regions of blue and red (hereinafter, this may be referred to "magenta light") is used, and the light-emitting diode 9M composes a second light source. And at the illumination device 8, the cyan light from the plural light-emitting diodes 9C and the magenta light from the plural light-emitting diodes 9M will be emitted alternately toward the liquid crystal panel 7 in the former half and the latter half of the one frame time period of the liquid crystal display device 2 (the details will be described later).

Figure 4A:
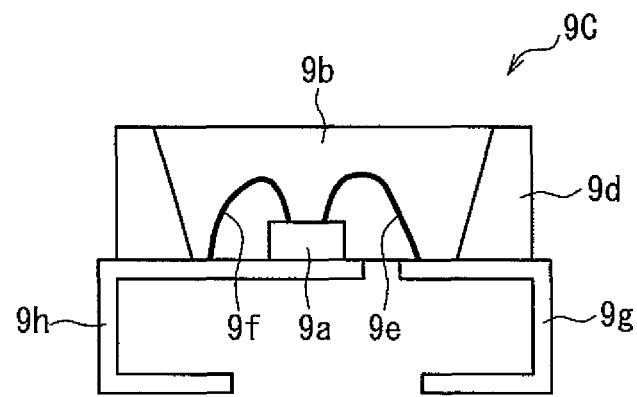
FIGS. 4A and 4B are diagrams for explaining a specific configuration of the light-emitting diode as shown in FIG. 3.

Specifically, as shown in FIG. 4A, each of the light-emitting diodes 9C has a semiconductor element 9a as an illuminant that emits blue light and a sealing resin 9b filled in a housing member 9d that houses the semiconductor element 9a and provided to cover the semiconductor element 9a. The light-emitting diode 9C is provided also with thin leads 9e, 9f connected to the semiconductor element 9a inside the housing member 9d, and further leads 9g, 9h connected respectively to the thin leads 9e, 9f outside the housing member 9d.

The semiconductor element 9a is set to emit blue light having a peak wavelength of 400 nm to 470 nm. For the sealing resin 9b, a transparent synthetic resin (for example, silicon resin) is used. Further, the sealing resin 9b contains a green phosphor that generates (excites) green light by use of the blue light. Therefore, the light-emitting diode 9C emits simultaneously blue light and also green light excited by the blue light.

Figure 4B:
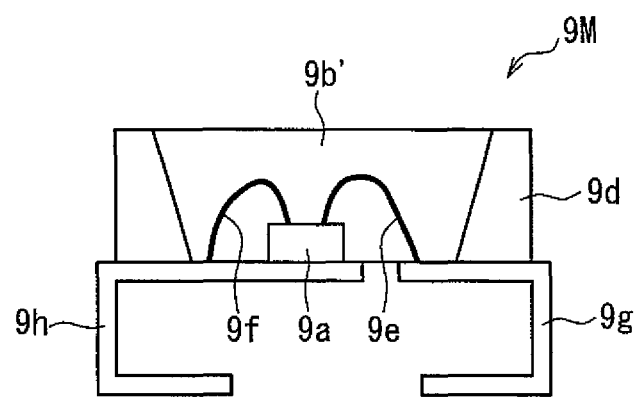

Similarly, as shown in FIG. 4B, each of the light-emitting diodes 9M includes a semiconductor element 9a as an illuminant that emits blue light, and a sealing resin 9b' filled in the housing member 9d that houses the semiconductor element 9a and provided to cover the semiconductor element 9a. The light-emitting diode 9M is provided also with thin leads 9e, 9f connected to the semiconductor element 9a inside the housing member 9d, and further leads 9g, 9h connected respectively to the thin leads 9e, 9f outside the housing member 9d.

For the sealing resin 9b', a transparent synthetic resin (for example, silicon resin) is used. Further, the sealing resin 9b' contains a red phosphor that generates (excites) red light by use of the blue light. Therefore, the light-emitting diode 9M emits simultaneously blue light and also red light excited by the blue light.

Figure 5:
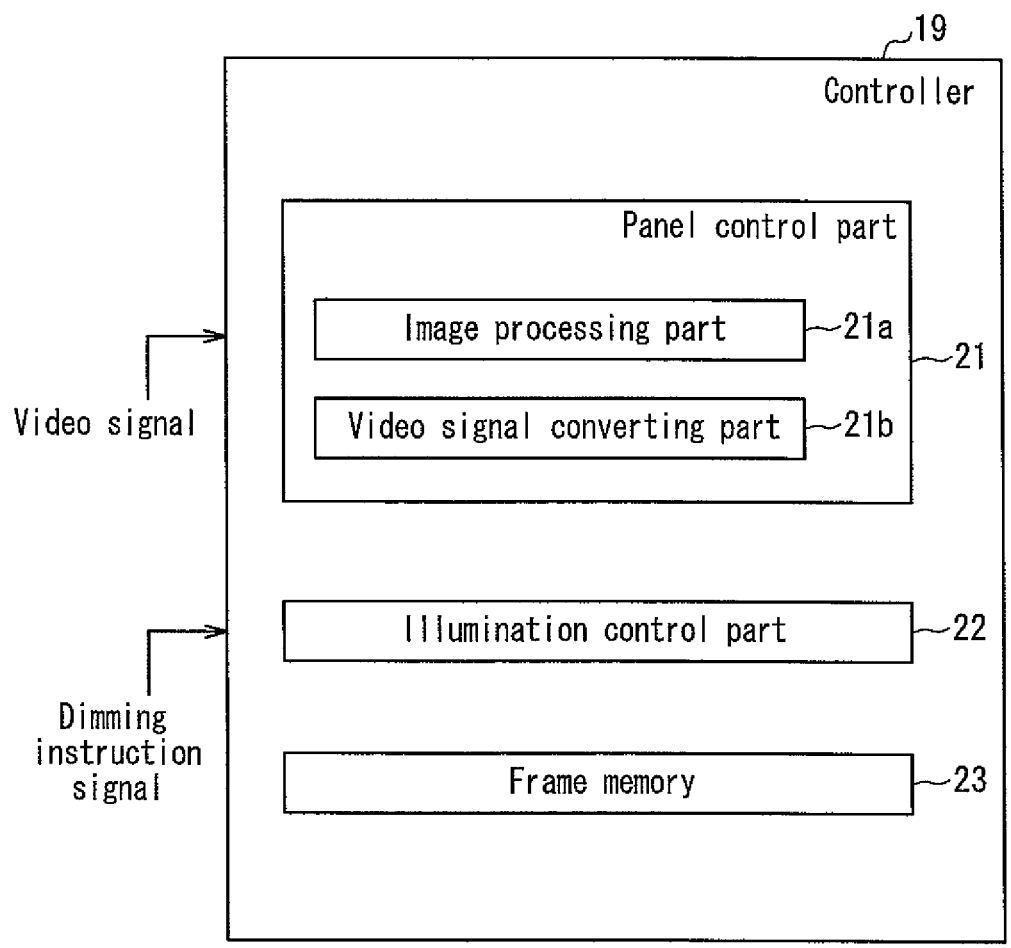
FIG. 5 is a block diagram showing a specific example of a configuration of the controller as shown in FIG. 3.

As shown in FIG. 5, the controller 19 is provided with a panel control part 21 as a display control part, an illumination control part 22 that conducts a drive control of the illumination device 8, and a frame memory 23 configured to be capable of storing display data of a frame unit included in a video signal inputted through an antenna (not shown) and the like. For this panel control part 21, for example ASIC (Application Specific Integrated Circuit) is used so that the panel control part 21 can conduct a predetermined arithmetic process at high speed with respect to the above-mentioned display data to be stored sequentially into the frame memory 23.

Further, the panel control part 21 is provided with an image processing part 21a and a video signal converting part 21b so as to conduct a drive control of the liquid crystal panel 7 for each pixel by use of inputted video signal. The image processing part 21a is configured to output instruction signals to the source driver 17 and the gate driver 18, such as the timing signals, in accordance with the inputted video signal. Further, the image processing part 21a is set to determine the size of the data signal (gradation voltage) for each pixel on the basis of the below-mentioned respective video signals for the former half and the latter half after being converted by the video signal converting part 21b and to output in a state being included in the instruction signal to the source driver 17.

The video signal converting part 21b is configured to generate for each pixel the respective video signals for the former half and the latter half of the one frame time period that displays one image on the liquid crystal panel 7. Namely, the video signal converting part 21b is set to convert the inputted video signal to the respective video signals for the former half and the latter half of the one frame time period, on the basis of the inputted video signal and the colors of lights from the light-emitting diodes (first and second light sources) 9C, 9M in the former half and the latter half of the one frame time period.

Specifically, the video signal converting part 21b acquires data of transmittances of the respective pixels from the display data included in the video signal for one frame retained in the frame memory 23. And, in accordance with a predetermined algorithm in view of the colors of lights from the first and second light sources, the video signal converting part 21b determines the respective transmittances in the former half and the latter half of the one frame time period of the corresponding pixels, by using the transmittances of the respective pixels acquired. Thereby, at the respective pixels, the respective transmittances in the former half and the latter half of the one frame time period are changed suitably in accordance with the inputted video signal and the color of illuminated light from the illumination device 8.

In detail, at the video signal converting part 21b, for every group of RGB pixels, the transmittances in the former half and the latter half of one frame time period at each of the pixels of RGB are determined as shown in Table 1 below, in view of the colors of lights from the first and second light sources.

Here, the group of RGB pixels denotes pixels of RGB that are connected to a common scanning line GL and located adjacent to each other (for example, the RGB pixels connected to the data lines DL1, DL2, DL3 as shown in FIG. 3), and the video signal converting part 21b is configured to determine the respective transmittances for the former half and the latter half of the one frame time period, for each of the RGB pixels adjacent to each other on the scanning line GL.

More specifically, the light from the first light source includes lights of blue and green (cyan light) from the light-emitting diode 9C, and the light from the second light source includes lights of blue and red (magenta light) from the light-emitting diode 9M. If the light-emitting diode 9C is turned on during the former half of the one frame time period and the light-emitting diode 9M is turned on during the latter half of the one frame time period, at the respective pixels of RGB, the respective transmittances for the former half and the latter half of the one frame time period are determined as shown in Table 1.

TABLE 1

| | R pixel | G pixel | B pixel | Lighting lamp |
|---|---|---|---|---|
| Former half of one frame time period | 0 | TG | TB/2 | Cyan light |
| Latter half of one frame time period | TR | 0 | TB/2 | Magenta light |

That is, when the transmittances of the pixels of red, green and blue in one frame time period, which are read out from the frame memory 23, are TR, TG and TB respectively, the video signal converting part 21b determines the transmittances of the pixels of red, green and blue in the former half and the latter half of the one frame time period as shown in Table 1.

A dimming instruction signal to instruct the change in the brightness of the illuminated light is inputted into the illumination control part 22 from a remote controller or the like provided to the television receiver 1. And the illumination control part 22 is configured to generate and output an instruction signal to the power source circuit 20b on the basis of the inputted dimming instruction signal, thereby controlling power supply to the light-emitting diodes 9 of the illumination device 8. Further, the illumination control part 22 generates and outputs a timing signal or the like with respect to the switching circuit 20a in accordance with the one frame time period in the liquid crystal panel 7 so as to turn on the light-emitting diode 9C alone during the former half of the one frame time period and to turn on the light-emitting diode 9M alone during the latter half of the one frame time period.

Figure 6:
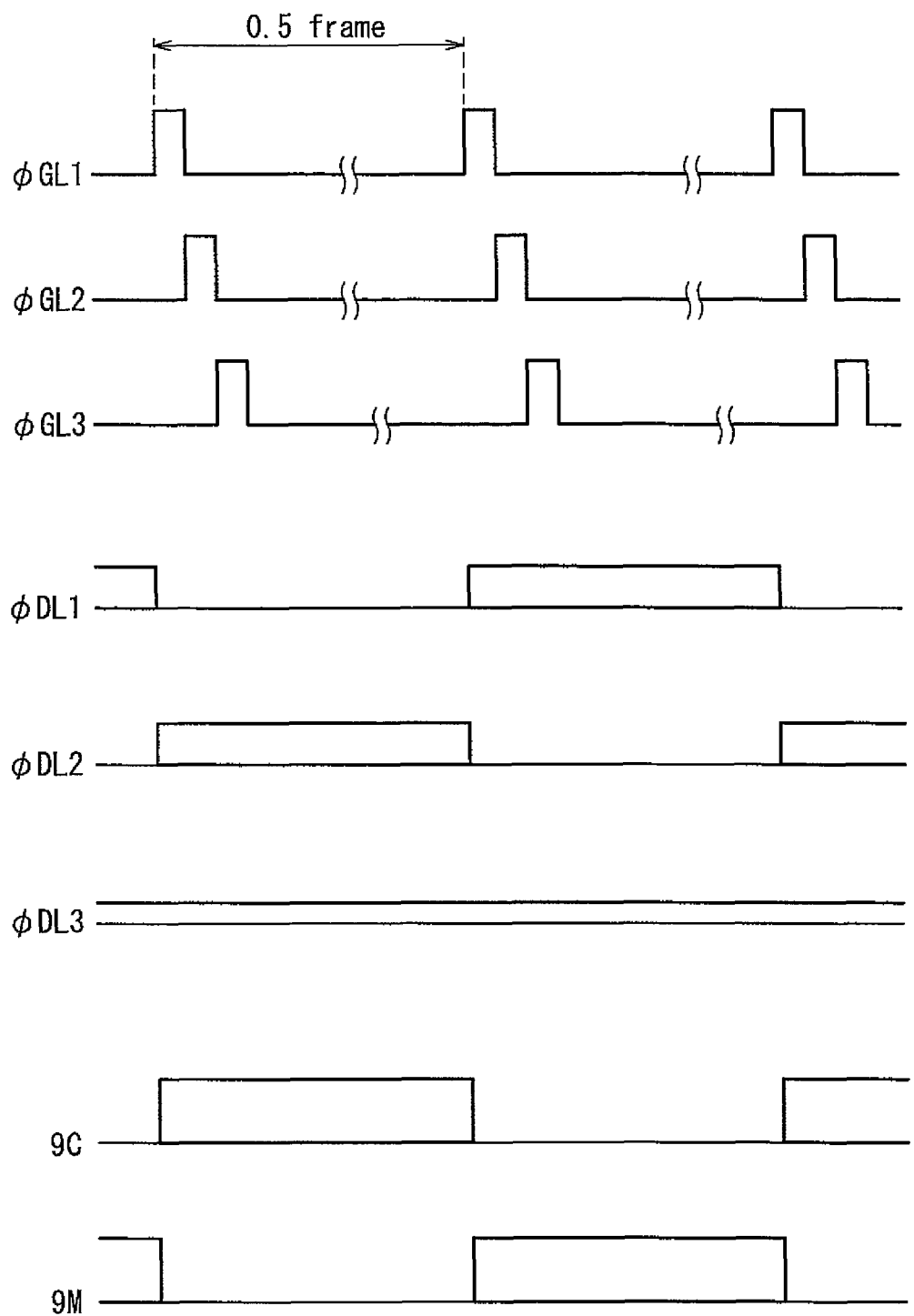
FIG. 6 is a timing chart showing an example of the relationship between a timing for turning on/off the light source in the liquid crystal display device, a timing for supplying data signal to a data line, and light emission amounts of the light sources.

In the liquid crystal display device 2 of the present embodiment configured as described above, in the former half of the one frame time period as shown in FIG. 6, the data lines DL2, DL5, DL8, . . . connected to pixel electrodes Pe corresponding to a green color filter and the data lines DL3, DL6, DL9, . . . connected to pixel electrodes Pe corresponding to a blue color filter are provided with data signals of a potential corresponding to the transmittances TG and TB/2. As a result, at the respective pixels of green and blue, transmission of light from the light-emitting diode 9C is permitted, thereby preventing degradation of the efficiency for utilization of lights of green and blue, and also to prevent occurrence of brightness degradation in the former half of the one frame time period.

Meanwhile, in the latter half of the one frame time period, the data lines DL1, DL4, DL7, . . . connected to pixel electrodes Pe corresponding to a red color filter and the data lines DL3, DL6, DL9, . . . connected to pixel electrodes Pe corresponding to a blue color filter are provided with data signals of a potential corresponding to the transmittances TG, TB/2. As a result, at the respective pixels of red and blue, transmission of lights of red and blue from the light-emitting diode 9M is permitted, thereby preventing degradation of the efficiency for utilization of lights of red and blue, and also preventing occurrence of brightness degradation in the latter half of the one frame time period. Further, since green light is not emitted in the latter half of the one frame time period, unlike the above-described conventional technique, green light will not be transmitted through the red pixels. As a result, in the present embodiment, it is possible to prevent unnecessary yellow light from being included in the light from the red pixels, and to improve the color purity of the red display.

The liquid crystal display device 2 of the present embodiment configured as described above is provided with light-emitting diodes (first light sources) 9C that emit lights of blue and green and light-emitting diodes (second light sources) 9M that emit lights of blue and red, and these light-emitting diodes 9C, 9M are controlled in lighting independently from each other by the illumination control part 22. In the liquid crystal panel (display element) 7, RGB pixels capable of displaying white color are provided, where the panel control part (display control part) 21 conducts a drive control of the liquid crystal panel 7 for each pixel by using the inputted video signal. Further, the panel control part 21 converts the inputted video signal to a video signal for the former half of the one frame time period and a video signal for the latter half of the one frame time period on the basis of the imputed video signal and the colors of lights from the light-emitting diodes 9C, 9M in the former half and the latter half of the one frame time period, and outputs toward the liquid crystal panel 7. Thereby, on the liquid crystal panel 7, it is possible to conduct an information display by using suitable video signals in accordance with respective lights from the corresponding light-emitting diodes 9C, 9M, in the former half and the latter half of the one frame time period. As a result, unlike the conventional example as described above, in the liquid crystal display device 2, it is possible to improve the color purity of the red display.

In the present embodiment, when the panel control part 20 converts the inputted video signal to a video signal for the former half of the one frame time period and a video signal for the latter half of the one frame time period, the panel control part 20 determines the respective transmittances in the former half and the latter half of the one frame time period of the corresponding pixels, by using the transmittances of the respective pixels of RGB during the one frame time period determined on the basis of the inputted video signal. Thereby, in the present embodiment, the panel control part 21 can determine more suitably the video signals for the former half and the latter half of the corresponding one frame time period in accordance with the respective lights from the light-emitting diodes 9C, 9M, and thus even when conducting a dynamic image display of high quality, the color purity can be improved reliably.

Furthermore, in the television receiver 1 of the present embodiment, since the liquid crystal display device 2 that can improve the color purity of the red display is used for the display part, a television receiver (electronic apparatus) having a display part with excellent display performance can be configured easily.

Second Embodiment

Figure 7:
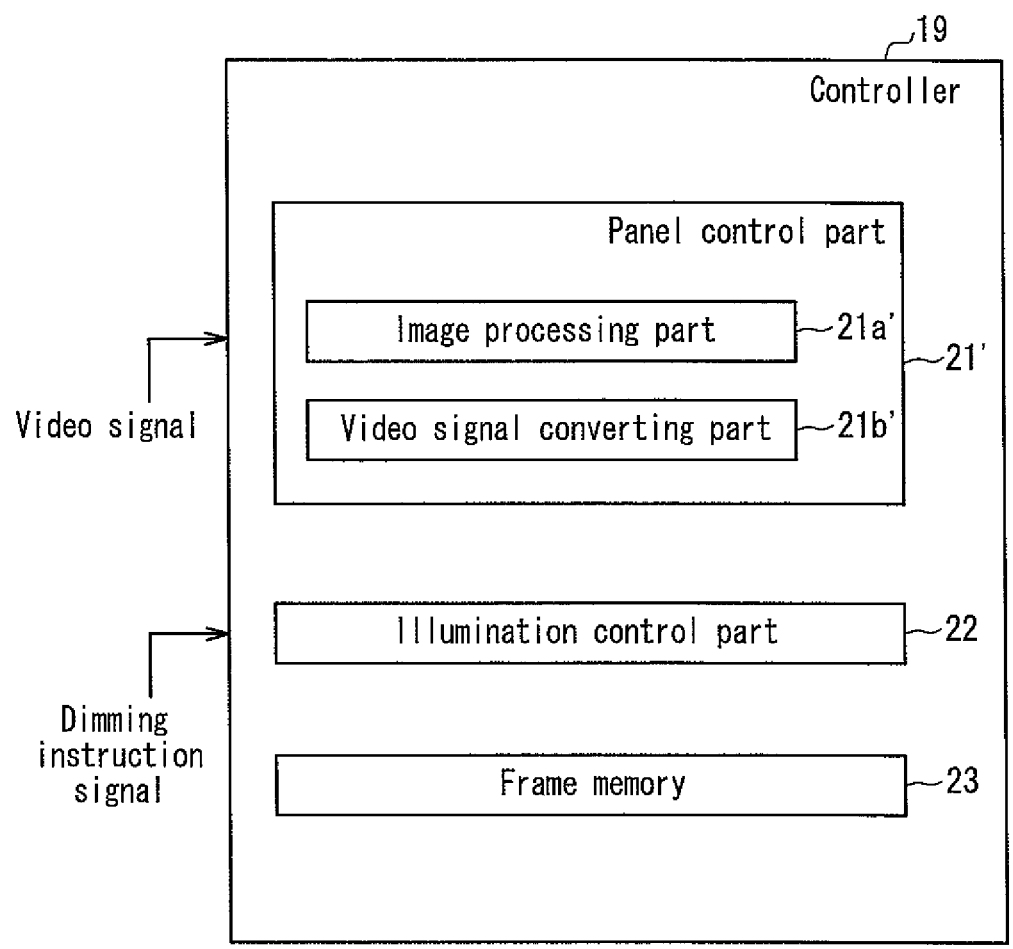
FIG. 7 is a block diagram showing a specific example of configuration of a controller according to Second Embodiment of the present invention.

FIG. 7 is a block diagram showing a specific example of configuration of a controller according to Second Embodiment of the present invention. In the drawing, the present embodiment is distinguished from the above-described First Embodiment mainly in that the panel control part uses values other than zero for the values of the respective transmittances in the former half and the latter half of the one frame time period at the respective pixels of red, green and blue. In the following description of embodiment, the same reference numerals may be assigned to the same components as those of First Embodiment in order to avoid the duplication of explanations.

Namely, as shown in FIG. 7, a controller 19 of the present embodiment is provided with a panel control part 21' as a display control part having an image processing part 21a' and a video signal converting part 21b'. The image processing part 21a' is configured similarly to that of First Embodiment so as to output instruction signals to the source driver 17 and the gate driver 18 in accordance with the inputted video signal. Further, the image processing part 21a' is set to determine the size of the data signal (gradation voltage) for each pixel on the basis of the below-mentioned respective video signals for the former half and the latter half after being converted by the video signal converting part 21b', and to output in a state being included in the instruction signal to the source driver 17.

The video signal converting part 21b' is configured to determine for every group of pixels of RGB the transmittances in the former half and the latter half of the one frame time period at each of the RGB pixels, by using a value other than zero in accordance with an algorithm as described below.

Specifically, at the panel control part 21', if the light-emitting diodes 9C are turned on during the former half of the one frame time period and the light-emitting diodes 9M are turned on during the latter half of the one frame time period, the video signal converting part 21b' determines the respective transmittances for the former half and the latter half of the one frame time period at the respective pixels of RGB as shown in Table 2.

TABLE 2

|  | R pixel | G pixel | B pixel | Lighting lamp |
|---|---|---|---|---|
| Former half of one frame time period | y | g | b2 | Cyan light |
| Latter half of one frame time period | r | m | b1 | Magenta light |

That is, when the transmittances of the red, green and blue pixels in one frame time period, which are read out from the frame memory 23, are TR, TG and TB respectively, the video signal converting part 21' applies these transmittances TR, TG and TB to the following inequalities (1), (2) and (3) so as to determine first a transmittance b2 of the blue pixel in the former half of the one frame time period, the transmittance m of the green pixel in the latter half of the one frame time period, and the transmittance y of the red pixel in the former half of the one frame time period.

$$b2 \leq \min(TB, TG) \quad (1)$$

$$m \leq \min(TR, TB) \quad (2)$$

$$y \leq \min(TG, TR) \quad (3)$$

In the above inequalities (1)-(3), min(A, B) indicates that the lower value of the values A and B is selected.

Subsequently, the video signal converting part 21b' determines the transmittance b1 of the blue pixel in the latter half of the one frame time period, the transmittance g of the green pixel in the former half of the one frame time period, and the transmittance r of the red pixel in the latter half of the one frame time period so as to satisfy the following equalities (1), (2) and (3) including coefficients α, β, γ and δ that satisfy the inequalities (4), (5), (6) and (7) below.

$$TR = r + \alpha y + \beta m \quad (1)$$

$$TG = (1+\delta)g + \alpha y + \beta m + \gamma b2 \quad (2)$$

$$TB = (b1+b2)/2 + \delta g + \gamma b2 \quad (3)$$

$$0 < \alpha \leq 0.5 \quad (4)$$

$$0 < \beta \leq 0.5 \quad (5)$$

$$0 < \gamma \leq 0.25 \quad (6)$$

$$0 < \delta \leq 0.25 \quad (7)$$

In the inequalities (4)-(7), α, β, γ and δ are coefficients preset on the basis of the configuration and material of the liquid crystal panel 7, set value of a white level relying on the RGB pixels, and the like. These coefficients α, β, γ and δ are determined in advance based on the results of a test using the product or simulations, for example.

Further, when a pure-white display is requested, i.e., when TR=TG=TB=1, the video signal converting part 21b' sets all values of the above-described transmittances y, g, b2, r, m and b1 to be 1.

Further, when an achromatic display is requested, i.e., when the respective values of the transmittances TR, TG and TB are equal to each other, the video signal converting part 21b' sets the above-described transmittances y, g, b2, r, m and b1 in order to satisfy the following equalities (4) and (5).

$$r = g = (b1+b2)/2 \quad (4)$$

$$b2 = y = m \quad (5)$$

Thereby, during the former half and the latter half of one frame time period, an appropriate achromatic color display can be conducted reliably with stable color tones for the display.

According to the above-described configuration, in the present embodiment, actions and effects similar to those in First Embodiment can be provided. Moreover, in the liquid crystal display device 2 of the present embodiment, since the panel control part (display control part) 21' uses values other than zero as the values for the respective transmittances during the former half and the latter half of the one frame time period at the respective pixels of red, green and blue as shown in Table 2, degradation of the efficiency for light utilization of the light-emitting diodes (first and second light sources) 9C and 9M can be prevented, thereby preventing degradation in the brightness.

In the present embodiment, the panel control part 21' determines the transmittances y, g, b2, r, m and b1 of the respective pixels of red, green and blue during the light-emitting diodes 9C, 9M are turned on in the former half and the latter half of the one frame time period, so as to satisfy the inequalities (1)-(3) and the equalities (1)-(3). Thereby, in the present embodiment, it is possible to conduct easily a control of gradually increasing the amount of light to be transmitted, with the trend that the video signals change from a low gradation to a high gradation at each of the pixels, and thus, the relationship between the gradation signal and the brightness (gamma characteristics) at the liquid crystal display device 2 can be adjusted easily to have a smoother form.

Third Embodiment

Figure 8:
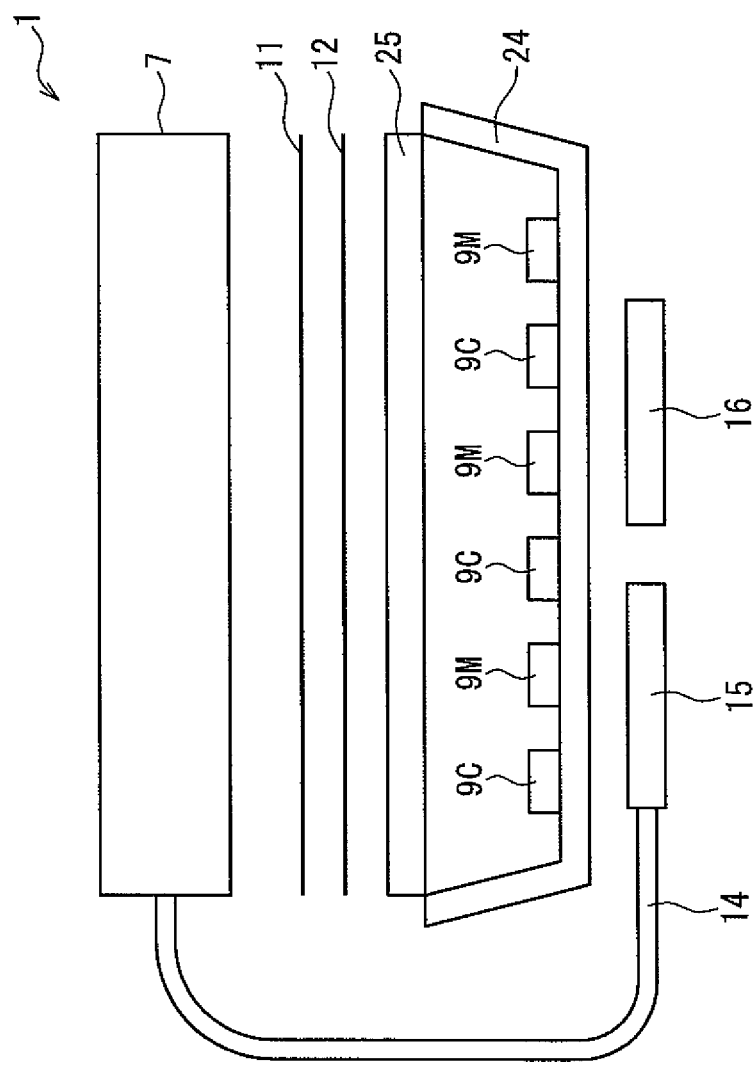
FIG. 8 is a diagram for explaining configurations of main parts of a liquid crystal display device according to Third Embodiment of the present invention.
Figure 9:
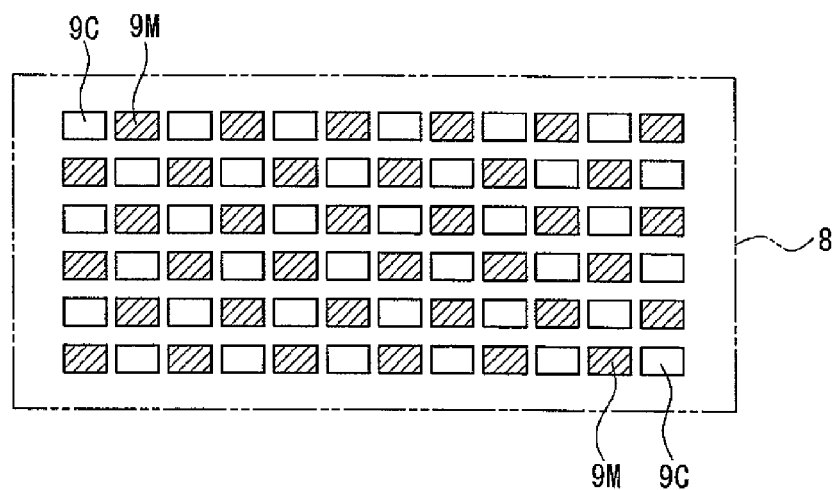
FIG. 9 is a plan view showing an example of placement of light-emitting diodes in an illumination device as shown in FIG. 8.
Figure 10A:
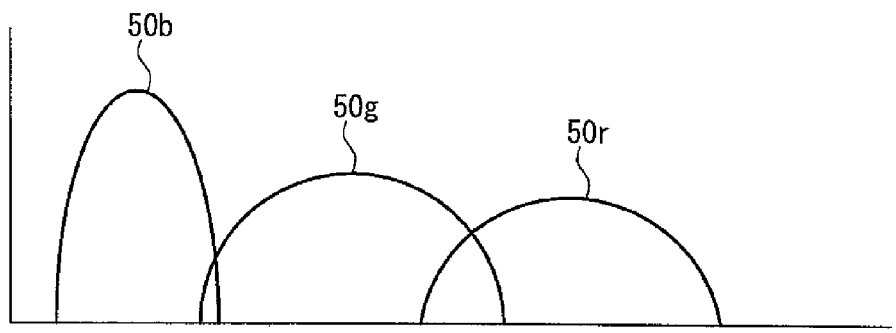
FIGS. 10A and 10B are diagrams for explaining problems of a conventional liquid crystal display device.
Figure 10B:
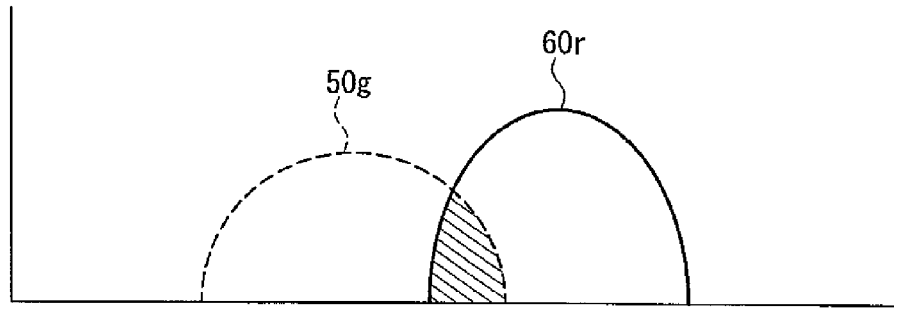

FIG. 8 is a diagram for explaining the configurations of main parts of a liquid crystal display device according to Third Embodiment of the present invention. FIG. 9 is a plan view showing an exemplary placement of light-emitting diodes in the illumination device as shown in FIG. 8. In these drawings, the present embodiment is distinguished from Second Embodiment mainly in that the above-described two kinds of light-emitting diodes are provided to face a liquid crystal panel and these two kinds of light-emitting diodes are placed within a predetermined distances from each other. In the following description of embodiment, the same reference numerals may be assigned to the same components as those of Second Embodiment in order to avoid the duplication of explanations.

Namely, as shown in FIG. 8, in the present embodiment, a plurality of light-emitting diodes 9C, 9M are housed in a chassis 24. The respective light-emitting diodes 9C, 9M are placed to face the liquid crystal panel (display element) 7 via a diffusion plate 25, a prism sheet 12, and a polarizing sheet 11.

Further in the present embodiment, as shown in FIG. 9, the light-emitting diodes 9C, 9M are arrayed alternately to be placed within a predetermined distance from each other. And in the present embodiment, similarly to Second Embodiment, the illumination control part 22 turns on the light-emitting diodes 9C, 9M respectively during the former half and the latter half of the one frame time period as shown in Table 2, and the display control part 21' determines the transmittances of the respective pixels of RGB so as to conduct an information display.

With the above-described configuration, the present embodiment can provide actions and effects similar to those in the above-described Second Embodiment. Further, in the liquid crystal display device 2 of the present embodiment, the light-emitting diodes (first and second light sources) 9C, 9M are provided to face the liquid crystal panel (display element) 7, and at the same time, these light-emitting diodes 9C, 9M are placed within a predetermined distance from each other. Thereby, in the liquid crystal display device 2 of the present embodiment, it is possible to prevent reliably the light-emitting diodes 9C, 9M from being visually-recognized independently.

Other than the configuration explained above, the display control part may be configured to determine the transmittances of the respective pixels of red, green and blue in the former half and the latter half of the one frame time period as shown in Table 1.

The above embodiments are shown merely for an illustrative purpose and are not limiting. The technical range of the present invention is defined by the claims, and all the changes within a range equivalent to the configuration recited in the claims also are included in the technical range of the present invention.

For example, although the above explanation refers to a case of applying the present invention to a television receiver containing a transmission type liquid crystal display device, the present invention is not limited to this example. The present invention can be applied to various display devices of non-luminous type that display information by use of light from light sources. Specifically, semi-transparent liquid crystal display device, or a projection type display device using a liquid crystal panel as its light bulb can be configured.

The electric apparatus of the present invention is not limited particularly as long as the display device of the present invention is applied to the display part to display information including characters and images. In addition to the above-described television receiver, the present invention can be applied preferably to information terminals such as personal computers and PDA, or various electric apparatuses such as monitors, instrument panels for automobiles, or ATM.

Although the above explanation refers to a case of using a liquid crystal panel (display element) having RGB pixels, the display element of the present invention is not limited particularly as long as it has pixels of plural colors that can display white color. Specifically, it may be configured to have CMY pixels to which tricolor filters of CMY are provided respectively. The present invention can be applied further to a configuration having plural colors of pixels using, for example, a four-color filter of RGB+Y or the like, a five-color filter of RGB+Y+C or the like, and a six-color filter of RGB+Y+C+W or the like.

Although the above explanation refers to a case where a first light source that emits lights of blue and green is turned on during the former half of one frame time period and a second light source that emits lights of blue and red is turned on during the latter half of the one frame time period, the present invention is not limited to this example specifically as long as the first light source that emits lights of blue and green is turned on during any one of the former half and the latter half of the one frame time period and the second light source that emits light in a complementary relationship with the light from the first light source (i.e., red light) is turned on during the other half of the one frame time period. Specifically, for example, it is possible to use a cold-cathode tube emitting lights of blue and green for the first light source and a red light-emitting diode for the second light source.

However, as in the respective embodiments mentioned above, application of a second light source that uses a blue illuminant that emits blue light and a red phosphor provided to cover the blue illuminant is preferred to a case of applying a red illuminant for the second light source, since a common blue illuminant can be used for the first and second light sources and thus the configurations and controls of the lighting circuits for the first and second light sources can be made common.

Further, as in the respective embodiments mentioned above, it is preferred to use a light-emitting diode that emits light having spectra mainly in the wavelength regions of blue and green for the first light source, and use a light-emitting diode that emits light having spectra mainly in the wavelength regions of blue and red for the second light source, since the configurations of the first and second light sources can be made simple, and thus a compact display device can be configured easily.

INDUSTRIAL APPLICABILITY

The present invention is applied preferably to a display device that can improve the color purity of red display, and an electric apparatus using the same.

The invention claimed is:

1. A display device comprising:
a first light source having a blue illuminant that emits blue light and a green phosphor provided to cover the blue illuminant,
a second light source that emits light in a complementary relationship with the light from the first light source,
a display element comprising pixels of plural colors that display colors different from each other, configured to be capable of displaying white color with the pixels of plural colors, where lights from the first light source and the second light source enter,
an illumination control part configured to be capable of controlling lighting of the first light source and the second light source independently from each other, and
a display control part that conducts a drive control of the display element for each pixel with use of an inputted video signal, wherein
the display control part converts the inputted video signal to a video signal for the former half of one frame time period and a video signal for the latter half of the one frame time period, on the basis of the inputted video signal and the colors of lights from the first light source and the second light source in the former half and the latter half of the one frame time period, and outputs the video signals toward the display element,
when the display control part converts an inputted video signal to a video signal for the former half of the one frame time period and a video signal for the latter half of the one frame time period, the display control part uses transmittances of the respective pixels of the plural colors during the one frame time period, the transmittances being determined on the basis of the inputted video signal, so as to determine the respective transmittances of the corresponding pixels in the former half and the latter half of the one frame time period,
pixels of red, green and blue are used for the pixels of plural colors,
the illumination control part turns on one of the first light source and the second light source and the other of the first light source and the second light source during one of the former half and the latter half of the one frame time period and during the other of the former half and the latter half of the one frame time period, respectively,
the display control part sets the transmittances of the pixels of red, green and blue as y, g and b2 respectively during the first light source is turned on in either the former half or the latter half of the one frame time period, and sets the transmittances of the pixels of red, green and blue as r, m and b1 respectively during the second light source is turned on in the other of the former half and the latter half of the one frame time period, and
when the transmittances of the pixels of red, green and blue in the one frame time period determined on the basis of the inputted video signal are set as TR, TG and TB respectively and when min(A, B) indicates that the lower value of the values A and B is selected, the transmittances y, g, b2, m, and b1 are determined to satisfy inequalities (1), (2) and (3) below:

$$b2 \leq \min(TB, TG) \quad (1)$$

$$m \leq \min(TR, TB) \quad (2)$$

$$y \leq \min(TG, TR) \quad (3)$$

and to satisfy equalities (1), (2) and (3) below including coefficients α, β, γ; and δ that satisfy inequalities (4), (5), (6) and (7) below:

$$TR = r + \alpha y + \beta m \quad (1)$$

$$TG = (1+\delta)g + \alpha y + \beta m + \gamma b2 \quad (2)$$

$$TB = (b1+b2)/2 + \delta g + \gamma b2 \quad (3)$$

$$0 < \alpha \leq 0.5 \quad (4)$$

$$0 < \beta \leq 0.5 \quad (5)$$

$$0 < \gamma \leq 0.25 \quad (6)$$

$$0 < \delta \leq 0.25 \quad (7).$$

2. The display device according to claim 1, wherein the display control part uses values other than zero as the values for respective transmittances in the former half and the latter half of the one frame time period, at the respective pixels of plural colors.

3. The display device according to claim 1, wherein the display control part determines the transmittances y, g, b2, r, m, and b1 for satisfying equalities (4) and (5) below when the transmittances TR, TG and TB are equal to each other:

$$r = g = (b1+b2)/2 \quad (4)$$

$$b2 = y = m \quad (5).$$

4. The display device according to claim 1, wherein the first light source and the second light source are provided to face the display element, and the first light source and the second light source are placed within a predetermined distance from each other.

5. The display device according to claim 1, wherein a blue illuminant that emits blue light and a red phosphor provided to cover the blue illuminant are used for the second light source.

6. The display device according to claim 1, wherein a light-emitting diode that emits light having spectra mainly in wavelength regions of blue and green is used for the first light source, and a light-emitting diode that emits light having spectra mainly in wavelength regions of blue and red is used for the second light source.

7. An electric apparatus comprising a display part that displays information including characters and images, wherein the display device according to claim 1 is used for the display part.

* * * * *